Oct. 31, 1950     N. P. W. FRISK ET AL     2,528,130
DEVICE FOR BLOWING AIR INTO A ROOM
Filed March 28, 1947     4 Sheets-Sheet 1
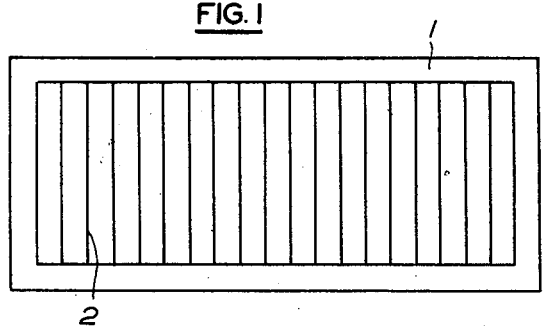
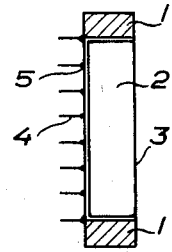
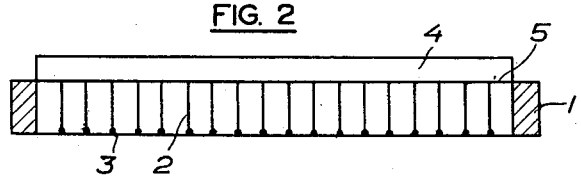
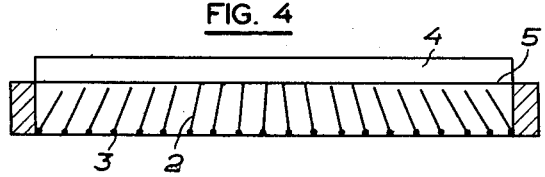
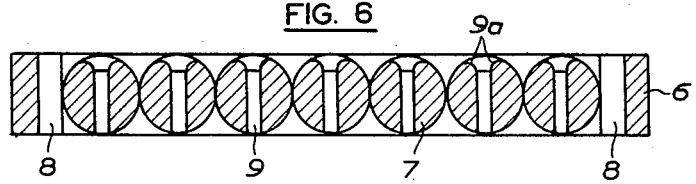
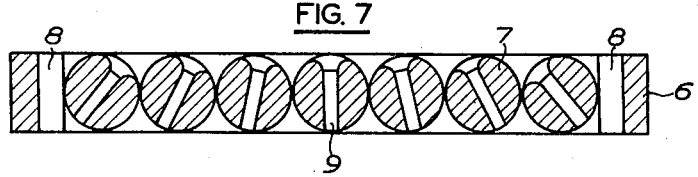
INVENTORS
Nils Pontus Wilhelm Frisk
Sven Werner Wallin
By: Arthur F. Robert
ATTORNEY INVENTORS
Nils Pontus Wilhelm Frisk
Sven Werner Wallin
By: Arthur J. Robert
ATTORNEY Oct. 31, 1950 N. P. W. FRISK ET AL 2,528,130
DEVICE FOR BLOWING AIR INTO A ROOM
Filed March 28, 1947 4 Sheets-Sheet 4
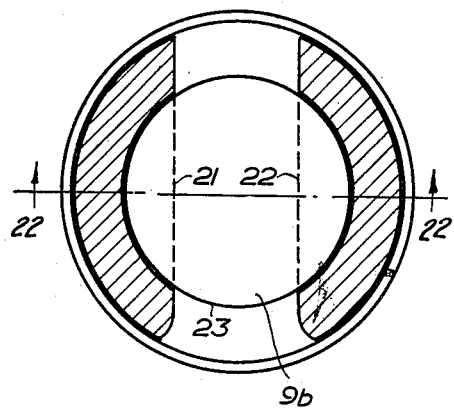
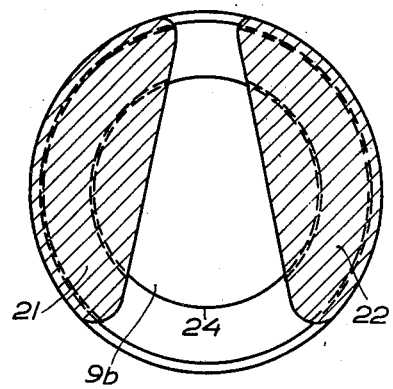
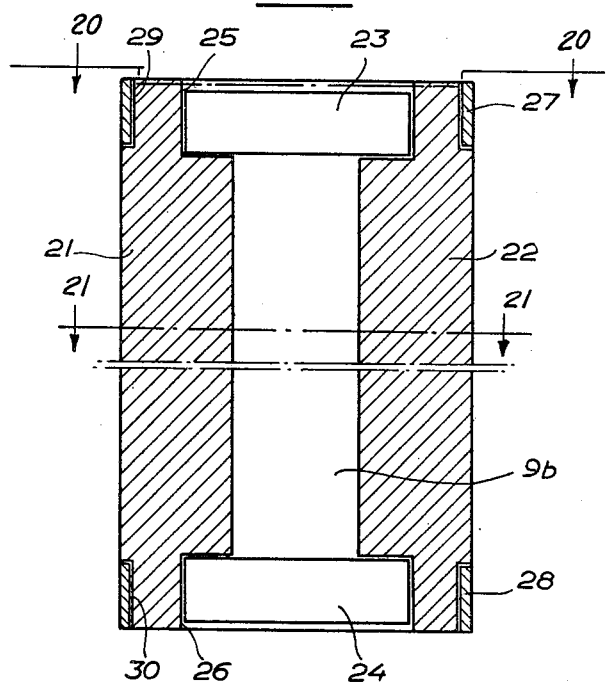
INVENTORS
Nils Pontus Wilhelm Frisk
Sven Werner Wallin
By: Arthur J. Robert
ATTORNEY Patented Oct. 31, 1950

2,528,130

UNITED STATES PATENT OFFICE 2,528,130

DEVICE FOR BLOWING AIR INTO A ROOM

Nils Pontus Wilhelm Frisk, Stockholm, and Sven Werner Wallin, Jonkoping, Sweden, assignors to A. B. Svenska Fläktfabriken, Stockholm, Sweden Application March 28, 1947, Serial No. 737,750
In Sweden March 28, 1946

13 Claims. (Cl. 98—40)

Blowing air into a room for the purpose of ventilating, heating or cooling the same is one of the most difficult problems in the air conditioning technic. Distribution of air into a room must be executed in such a manner that the air velocity is not noticeable for a person in the zone of occupancy in the room, that is to say that the air does not cause any draught. Nevertheless, blowing in of the air, must occur in such manner that the entire volume of the room receives ventilation.

The problem is most difficult, if the room is to be cooled, in which case the blown in air has to be cooler than the air inside the room. The danger of draught will then be greater because the impression of draught in fact is the result of an impression of cooling which not only depends on the velocity but also on the temperature of the blown in air. Blowing in of cold air is complicated in that, the cold air, which is heavier than the air inside the room, is inclined to sink, whereby the danger of being touched by a stream of cold air will be much greater for persons in the room.

That will be avoided if the cold blown in air is mixed effectively with the air of the room. For the purpose of providing a mixing of that kind the blown in air must be subdivided into air beams, having an initial velocity sufficiently great so that they carry along the air surrounding them, thereby effecting the mixing operation. The velocity of the air must, however, also be adjusted to advance through the greatest part of the room. In such places in the room, however, where people are located, the velocity must be decreased sufficiently in order to avoid draught. This border-velocity usually is assigned a maximum of two-tenths meter per second (0.2 m./s.). The distance between the blowing in opening and that point of the room in which the velocity of the air is decreased to 0.2 m./s. is called "length of throw."

In air conditioning plants varying requirements of heating and cooling are often encountered. In winter often heating followed by cooling may be required, for instance, in crowded localities (cinemas, theaters, restaurants, etc.), or in localities generating great heat from machines and heating apparatus. It may thus happen that heating is required in a locality in the morning, before the locality is heated up by the machines, and later on cooling is required. As a consequence thereof the blown in air has to be warmer at certain times and cooler at other times than the air of the locality.

Being restricted by practical reasons to only one member for blowing in air in both cases, this blowing in member must satisfy the requirements of subdividing the air in a suitable manner when it is blown in either warmer or cooler than the air of the room.

If the air is blown in warmer than the air of the room, it has a disposition to remain along the ceiling owing to its lower specific gravity. It may happen then that a blowing in member operating satisfactorily with cold air, which owing to its gravity diffuses more quickly, causes draught when blowing in warm air. That is explained because the warm air, which strikes along the ceiling, maintains a relatively great velocity, and when this air strikes an obstacle or a wall, deflects the air of the room downwards and causes draught. On the other hand a blowing in member adjusted for warm air may be useless for blowing in cold air. The latter is usually the case.

The condition for blowing in cold air free from draught is, as already mentioned, that the initial velocity of the air is sufficiently great. It is possible to show theoretically and to establish by experiment the existence of uniformity between the relationship of temperature and velocity. If, for instance, a beam of air is blown in with a velocity of 10 m./s. at a temperature 10° C. below the room temperature, this temperature difference is reduced to 5° C. when the velocity is decreased to 5 m./s. and so on. At a velocity of 0.2 m./s. the temperature difference is only 0.2° C. The same analogy is valid if the air is blown in at higher than room temperature. If the air is blown in with a very great velocity difficulties may arise in decreasing the velocity in a satisfactory manner, that is the length of throw will be too great. Further the consumption of power increases with the square of the velocity of the air. Also, when the pressure exceeds a certain point the difficulty of blowing in air without noise is added and the latter is an unavoidable requirement in most ventilation plants.

A certain minimum-pressure is, however, in all circumstances desirable to obtain a good distribution of the air over the different blowing in openings. If the blowing in openings are operating with air at low pressure, shutting off one opening may involve an unsuitable increase of pressure at the other. Partly shutting of an opening may involve the contrary effect, namely, increasing of the air velocity so much that it causes draught. That does not occur if the air pressure is sufficiently great. A proper pressure facilitates also the adjustment of the plant, because the air quantity per blowing in opening then will be easier to determine. If the air on the other hand is blown in at a low pressure the adjustment will be troublesome owing to the fact that an adjustment of one of the blowing in devices is followed by an alteration in the quantity of air passing through the other and so on. As a suitable range of pressure may be mentioned 4-6 mm. aq. The requirements for a blowing in device are thus as follows.

1. The flow of air in the horizontal direction and its spreading horizontally must be adjustable for different needs with respect to the size of the room, the location of the zones occupied by people visiting the room and so on, without changing thereby the quantity of air.

2. The air must be blown in at a comparatively high pressure and at a high velocity with the object of obtaining a sufficiently effective distribution of air at the different blowing in places and an effective mixing of the blown in air and the air of the room.

3. The flow of the air in vertical direction must be varied in an effective and easy manner to give the best possible result in heating, cooling or a combination of the two.

4. The quantity of air must be varied by decreasing the initial velocity without changing of the pressure.

5. The quantity of air must be varied by adjusting the flow through area and maintaining the initial velocity intact.

6. The blowing in must occur without causing disturbing noises.

7. The device must be easy to adjust and its directing members should be hidden on the rear side of the said device but easy of reach from the front side (outlet side).

This invention, which relates to a device for blowing in air or the like in a room, consists of a plurality of movable bodies guiding the air, which forms a so-called blowing in grille, as a solution of the problem mentioned above.

According to the invention the device is substantially characterized in that the movable bodies provide passageways therethrough for the air, which do not change in area upon angular adjustment of the bodies. Other characteristic features of the invention will be understood from the following claims and from some embodiments more particularly described below.

The invention is illustrated in various embodiments in the enclosed drawings.

In the drawings, Figures 1, 2 and 3 are diagrammatically illustrated front, horizontal sectional and vertical sectional views respectively of a known type of grille. Figures 4 and 5 are views similar to Figures 2 and 3 respectively showing the grille adjusted in different positions. Figure 6 is a horizontal sectional view of the grille shown in Figure 8. Figure 7 is a similar horizontal sectional view of the grille in the position shown in Figure 9. Figure 8 is a front elevation of a grille illustrating the invention. Figure 9 is a view like Figure 8 with the grille in adjusted position. Figures 10 and 11 are middle sectional views of the grille in Figure 8 having a deflecting member on the pressure side. Figures 12 to 15 are similar views of the grille showing a modified form of deflector in various adjusted positions.

Figure 8:
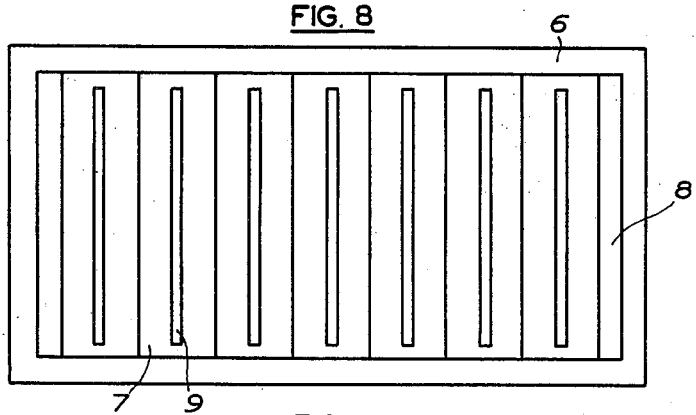
Figure 9:
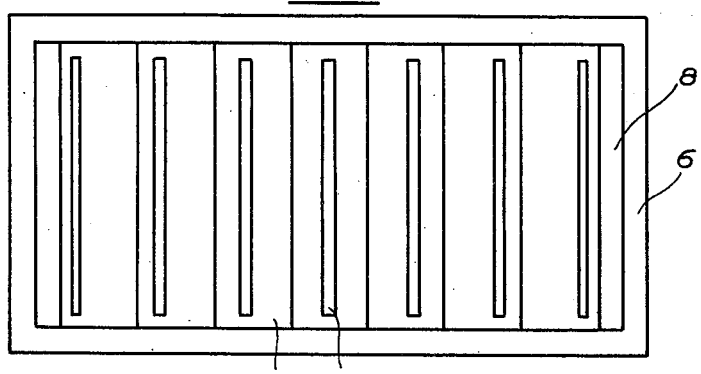

Figure 20 is a cross sectional view taken on line 20—20 of Figure 22 of a modification. Figure 21 is a cross sectional view taken on line 21—21 of Figure 22 with the parts in a different adjusted position, and Figure 22 is a cross sectional view taken on line 22—22 of Figure 20.

The known type of blowing in grille shown in Figures 1-5, allows directing of the air in an adjustable manner in the horizontal direction as well as in the vertical one and a certain regulation of the quantity of air. The grille consists of a frame 1 of rectangular shape in which a number of vertical guide-blades 2 are arranged so that they can be turned around pivots 3 at their front edges. Behind those guide-blades 2 there are another number of guide-blades 4 extending horizontally and rotatably journalled on their pivots 5 in the frame, which pivots are provided at the front edge of the guide-blades 4. In Figures 1, 2 and 3 the guide-blades 2 and 4 are adjusted so that their planes are at right angles to the plane of the frame 1. The air passing through the grille receives thereby a direction which is at right angles to the plane of the frame 1. By turning the guide-blades 2 and 4, respectively, around their pivots, the direction of the air will be changed to different directions. In Figure 4 the guide-blades 2 are arranged for spreading the air in a fan-shaped manner, whereas simultaneously therewith the air-flow is directed upwards against the ceiling of the locality by the guide-blades 4. In the embodiment according to Figures 1-5 it is, however, impossible to change the direction of air flow without changing the area of the openings. A reduction of the area may be accomplished by a given adjustment of the guide-blades thereby increasing the resistance to flow, but in this case the adjustability will be lost substantially. A too great limitation of the area in connection with increasing of the pressure further will give rise to whirling-motions on account of the crosswise arranged guide-blades and will cause disturbing noises as a result thereof.

According to Figures 6-9 the blowing in grille consists of a rectangular frame 6 in which a number of bodies 7 rotatably mounted are arranged close up to each other. The bodies 7 are shaped as rolls which are substantially cylindrical. The bodies are pressed towards each other by an elastic member 8 of felt, sponge-rubber or something like that and are arranged between the frame 6 and that body 7 which is positioned immediately adjacent to it. The member 8 forms preferably simultaneously a sealing device between the frame and the adjacent body. The ends of the said bodies extend preferably into top and bottom channel bars of the frame which bars with their flanges and centre-plate forms bearings for the bodies. In each body there is an elongated channel or passageway 9 therethrough. In the figures the channel 9 has a constant rectangular cross sectional area, though the inlet edges of the channels are rounded off at 9a (Figure 6).

Owing to the cylindrical shape the bodies can be turned around their respective pivots independently of each other and without changing their total front width. If the bodies are adjusted as seen in Figures 6 and 8, the direction of flow of the air will be at right angles to the frame 6. If the bodies are adjusted according to Figures 7 and 9, the air will be spread in a fan-shaped manner, and the total area will remain unaltered. If the channel 9 is made narrow in relation to the diameter of the body 7, for instance 10 to 30% of the latter, an effective mixing of the blown in air and the air in the room is obtained because the air of the room, by reason of the great velocity and high pressure of the beams of air entering the room, flows into the spaces between the air beams. Thus, the air entering between the beams will be distributed uniformly over the front surface of the grille, even if the air behind the grille has a direction of movement forming an acute angle to the plane of the frame. That is, however, not the case in a grille according to Figures 1-5, in which the outlet velocity of the air is very dependent on the velocity and the direction of flow of the air at the rear side of the grille.

Figure 10:
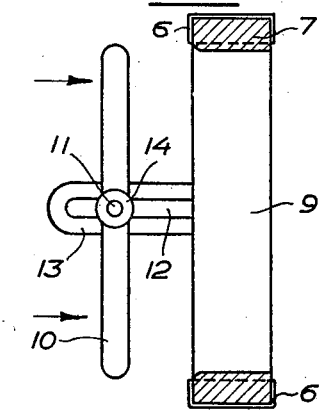
Figure 11:
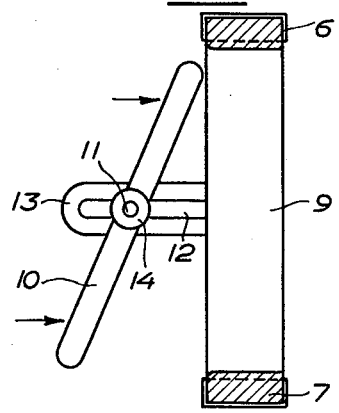
Figure 12:
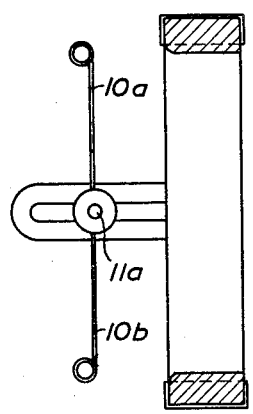
Figure 13:
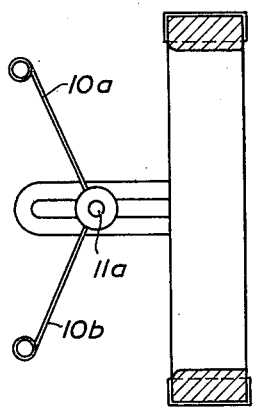
Figure 14:
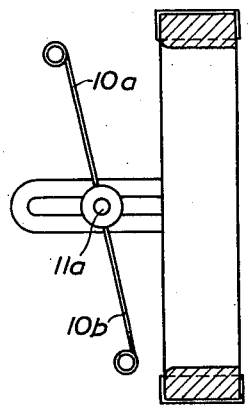
Figure 15:
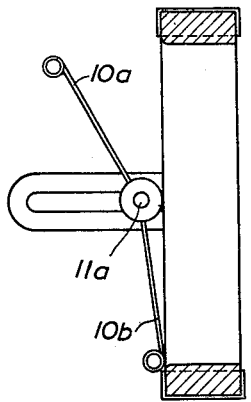

Figures 10 and 11 disclose a directing member guiding the air-flow in a vertical direction and regulating the air-quantity by varying the air velocity through the channels 9. The body 7 is the same in these figures as in Figures 6-9. The directing member comprises a plate 10 provided with rounded edges, which plate is mounted rotatably on a spindle 11 in the plane of plate 10, forming two pivots received in slots 12 cut out in supports 13 fixedly mounted at the frame 6, one at each side thereof. The slots 12 and the supports 13 extend rearwards at right angles to the plane of the frame 6. The spindles 11 are at right angles to the longitudinal axes of the bodies 7. The spindles 11 further are fitted into the slots 12 by friction so that merely the friction will permit the plate 10 to be fixedly adjusted in the desired angular position. Washers 14 may be applied at one or at both sides of the support 13 as a guiding means for increasing the frictional action between the plate and the support. In certain cases the ends of the spindle may be screw threaded to receive a clamping nut, and by tightening said nut the frictional action may be increased between the plate and the support. The construction not only permits turning of the plate but also displacing it towards and away from the bodies 7. In Figure 10 the plate 10 is positioned parallel to the frame 6 but at a certain distance therefrom whereby the air inlet flow will be distributed symmetrically. If the plate 10 on the other hand is positioned as in Figure 11 the air inlet flow occurs substantially from below and the air-flow through the slots 9 will be directed upwards. The closer the plate 10 is positioned up to the frame 6 the lower the air velocity will be through the channels 9, and the quantity of air delivered also will be smaller. Simultaneously the length of throw will be decreased.

Another embodiment of the directing member is disclosed in Figures 12-15. In this case the directing member comprises two plates 10a and 10b respectively which are rotatably mounted on a rod 11a to move independently of each other.

The plates 10a and 10b consist of sheet-metal the free edges of which are curved tubularly. The plates are attached to the rod 11a in the same way as a hinge. The remaining parts of the construction according to Figures 12-15 are constructed as in Figures 10 and 11. In this case the end parts of the rod 11a may have a squared section so that the rod cannot be turned in its supports but only can be displaced towards and away from the frame. The plates 10a and 10b on the contrary are mounted rotatably independent of each other on the rod 11a.

By means of the directing members according to Figures 12-15 the same actions may be obtained as by the plate 10 and in addition a greater passage opening for the air may be obtained at the upper and lower edges (Figure 13) of the plates 10a and 10b than in the case in Figure 10, and that is important if the air is supplied through a trunk having substantially the dimensions of the frame 6. Besides one may cause a total closing of the one half part of the grille (compare Fig. 15) by aid of one of the plates 10a or 10b.

Figure 16:
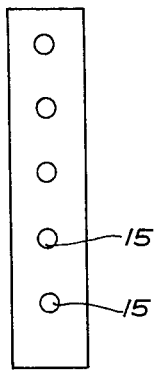
Figures 16 and 17 are an external view and an axial section, respectively, of a modified embodiment of a movable body on the grille.
Figure 17:
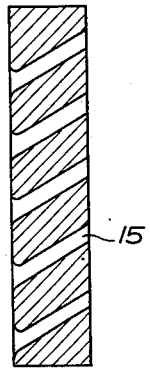

The bodies 7 may be constructed in different manners. According to Figures 16 and 17 each body consists of a cylindrical member provided with a number of bores 15 forming parallel channels with each other in one or more rows. The channels may have any arbitrary direction but in certain cases it may be advantageous to direct them somewhat upwards as in Figure 17. The inlet edges of these bores are preferably also rounded. The columns of bores 15 provide a plurality of small jets of air which merge in the room to form laterally spaced generally rectangular beams so that the air entering between such beams is effectively mixed therewith.

Figure 18:
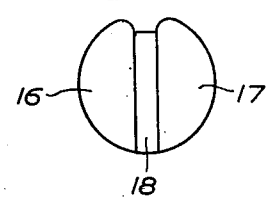
Figure 18 is an end-view of another modification.

In Figures 6-15 the channels 9 are formed in the bodies 7 by a milling operation. According to Figure 18 the body 7 may comprise two profile bars 16 and 17 of substantially segmental or semicircular section, which are nailed, pasted or in other manner fixed at each end to pieces 18 to form a cylindrical body.

Figure 19:
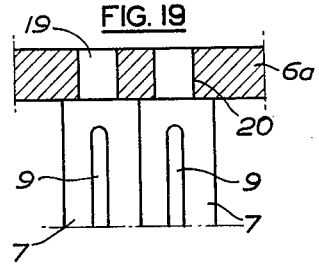
Figure 19 is a part of a construction showing how the bodies may be journalled.

In certain cases the end parts of the bodies 7 may be provided with pivots 19 as in Figure 19 which are fitted into corresponding holes 20 in the modified framework 6a which in this case does not need any channel bar.

The Figures 20-22 disclosed a special type of a body according to the invention. The body 7 consists in this case of two bars 21 and 22 substantially segmental in cross-section with rounded inlet and outlet edges. The bars are spaced from each other by circular discs 23 and 24 which are mounted in recesses 25 and 26 of corresponding shape in the ends of the bars. The bars 21 and 22 are held assembled against the discs 23 and 24 by holding members, preferably in the shape of cylindrical rings 27 and 28 located one at each end of the bars, in recesses 29 and 30. The bars 21 and 22 and the discs 23 and 24 form the channel 9b for passage of air. This construction allows the bars 21 and 22 to move around the discs 23 and 24. In Figure 20 the channel 9b is shown with opposed parallel walls, and in Figure 21 with inclined walls. The inclined walls may be made to slope in either direction. The friction between the parts must be such that after the bars 21 and 22 are adjusted relatively to each other to a certain position this adjustment does not change when the whole body 7 is rotated around its longitudinal axis. The adjustability of the bars allows an increase in air quantity without a change of pressure or velocity.

The rounding of the inlet edges of all channels and the free edges of all directing plates has in view preventing the rise of disturbing noises.

In order to prevent air from leaking out through the clearances between the end parts of the bodies 7 and the frame 6 (Fig. 10) which would produce hissing sounds, a packing material preferably may be put in between those parts.

Instead of using a common rod 11a for the directing members 10a and 10b in the Figures 12-15 each directing member 10a and 10b may be provided with its own shaft, which shafts preferably are parallel and arranged the one above the other. Each one of said shafts is then preferably journalled into a hole in each one of the supports 13 without being displaceable in a slot 12. This embodiment is specially simple, cheap and reliable. In certain cases both shafts may be journalled rotatably with their end parts into holes in a cubical piece, which cubic pieces are mounted into slots corresponding to the slots 12, and displaceable in the said slots towards and away from the bodies 7.

The bodies 7 are adjusted for changing of the air direction preferably by manual turning. That may be accomplished by a plane lever which is to be put into the channel of each body. If necessary bodies adjacent each other may be fixed against rotation so that they do not change their adjusted positions. The adjustment of the directing members 10, 10a and 10b may be provided by wires bent in a suitable manner, which are to be put in through the channels of the bodies 7.

Without departing from the idea of this invention the latter may be varied within great limits with respect to its embodiment.

Having now described our invention, what we claim as new, and desire to secure by United States Letters Patent, is:

1. A device for deflecting air into a locality comprising: a frame; a plurality of parallel cylindrical bodies mounted in substantially surface contact with each other in said frame for rotation about their respective longitudinal axes; each said body being provided with at least one transverse air passageway therethrough, for discharging air into the locality in spaced air beams.

2. A device as described in claim 1 wherein said air passageway comprises a rectangular slot.

3. A device as described in claim 2 wherein said air passageways comprise about 10% to 30% of the horizontal center-to-center space between said passageways.

4. A device as specified in claim 2 wherein said bodies each comprise rotatably journalled end pieces and pairs of cylindrical segmental connecting pieces angularly adjustable relative to the end pieces, the flat sides of the cylindrical segments being located in spaced relation to provide rectangular slots, maintaining a constant area independently of the angular positions of the end pieces.

5. A device as specified in claim 2 wherein said slots are of uniform cross-sectional area.

6. A device as specified in claim 1 wherein said passageways are expanded on the air inlet sides thereof.

7. A device as specified in claim 1 wherein said passageway comprises a longitudinal row of spaced openings in each body.

8. A device as described in claim 1 having elastic sealing means between the frame and the end bodies and serving to maintain said bodies in mutual engagement.

9. A device as described in claim 1 wherein said frame includes end channel members journalling said bodies for rotation therein.

10. A grill for regulating the flow of air therethrough from a duct comprising: a frame; a plurality of parallel cylindrical bodies carried in said frame substantially in surface contact with each other, each body comprising a pair of cylindrical segments; a pair of end members retaining said segments with the flat sides thereof in spaced relation to form a slot therethrough, and retaining rings encircling said segments and end members, said rings being journalled in the frame, to allow the bodies to be rotated without changing the relative positions of said pairs of segments.

11. A grille as specified in claim 10 wherein said end members are circular discs, and the ends of said segments are internally recessed to receive said discs.

12. A grille for an air duct comprising: a frame; a plurality of cylindrical bodies rotatably journalled in said frame in substantial surface contact with each other, each body providing at least one transverse passageway for discharge of air therethrough in spaced beams; and a deflector on the air inlet side of said grille bodily adjustable to and away from said grille for controlling the volume of air, and angularly adjustable on an axis transverse to the axes of the bodies, for controlling the direction of the air beams.

13. A device for blowing in air into a locality comprising: a frame; a plurality of parallel bodies rotatably mounted in said frame, each body having a transverse air passageway therethrough to provide a plurality of spaced air beams flowing therethrough; a deflecting member positioned on the pressure side of said bodies comprising a spindle and a plate rotatably mounted thereon for adjustment to different positions on said spindle; and means supporting said spindle for adjustment toward or away from said bodies; said plate serving to distribute air flow to the air passageways and to impart a direction to the air beams flowing through the air passageways.

NILS PONTUS WILHELM FRISK.
SVEN WERNER WALLIN.

REFERENCES CITED

The following references are of record in the file of this patent:

UNITED STATES PATENTS

| Number | Name | Date |
| --- | --- | --- |
| 680,280 | Roesser | Aug. 13, 1901 |
| 1,559,057 | Stewart | Oct. 27, 1925 |
| 1,730,348 | Anstiss | Oct. 8, 1929 |
| 1,872,007 | Reilly | Aug. 16, 1932 |
| 1,886,313 | Stewart | Nov. 1, 1932 |
| 2,104,279 | Sperry | Jan. 4, 1938 |
| 2,106,458 | Kurth | Jan. 25, 1938 |
| 2,337,280 | Serre et al. | Dec. 21, 1943 |
| 2,339,629 | Fischer, Jr. | Jan. 18, 1944 |
| 2,366,264 | James | Jan. 2, 1945 |
| 2,396,025 | Seid | Mar. 5, 1946 |

FOREIGN PATENTS

| Number | Country | Date |
| --- | --- | --- |
| 263,953 | Great Britain | Jan. 10, 1927 |
| 377,634 | Great Britain | July 28, 1932 |